United States Patent [19]

Coates et al.

[11] Patent Number: 5,746,940
[45] Date of Patent: May 5, 1998

[54] LIQUID CRYSTALLINE MATERIAL COMPRISING TERPENOIDS

[75] Inventors: David Coates; Alison Linda May, both of Wimborne, Great Britain

[73] Assignee: Merck Patent Gesellschaft mit beschrankter Haftung, Darmstadt, Germany

[21] Appl. No.: 593,867

[22] Filed: Jan. 30, 1996

[30] Foreign Application Priority Data

Jan. 31, 1995 [GB] United Kingdom ............... 9501853

[51] Int. Cl.$^6$ ............... C09K 19/52; C09K 19/30; C09K 19/12; C09K 19/20
[52] U.S. Cl. ............... 252/299.01; 252/299.63; 252/299.66; 252/299.67
[58] Field of Search ............ 252/299.01, 299.66, 252/299.67, 299.63

[56] References Cited

U.S. PATENT DOCUMENTS

| | | | |
|---|---|---|---|
| 4,784,793 | 11/1988 | Coates et al. | 252/299.62 |
| 4,824,217 | 4/1989 | Chan et al. | 359/104 |
| 5,187,298 | 2/1993 | Etzbach et al. | 549/555 |
| 5,188,760 | 2/1993 | Hikmet et al. | 252/299.01 |
| 5,188,815 | 2/1993 | Coates et al. | 424/7.1 |
| 5,210,630 | 5/1993 | Heynderickx et al. | 359/106 |
| 5,518,652 | 5/1996 | Parri et al. | 252/299.01 |
| 5,538,768 | 7/1996 | Marden et al. | 428/1 |
| 5,560,864 | 10/1996 | Goulding | 252/299.01 |
| 5,585,035 | 12/1996 | Nerad et al. | 252/299.01 |

FOREIGN PATENT DOCUMENTS

| | | |
|---|---|---|
| 415 905 A1 | 10/1992 | European Pat. Off. . |
| 2280681 | 2/1995 | United Kingdom . |
| 86/04328 | 7/1986 | WIPO . |

*Primary Examiner*—C. H. Kelly
*Attorney, Agent, or Firm*—Millen, White, Zelano & Branigan, P.C.

[57] ABSTRACT

The invention relates to a liquid crystalline material in the form of an anisotropic gel consisting of a polymerized monotropic or enantiotropic liquid crystalline material and a chiral nematic low-molecular weight liquid crystalline material, wherein the polymerized material a) forms a permanently oriented network in the low-molecular weight liquid crystalline material b), characterized in that the low-molecular weight liquid crystalline material b) comprises at least one chiral mesogenic terpenoid derivative.

19 Claims, No Drawings

LIQUID CRYSTALLINE MATERIAL COMPRISING TERPENOIDS

The invention relates to a liquid crystalline material in the form of an anisotropic gel consisting of a polymerized monotropic or enantiotropic liquid crystalline material and a chiral nematic low-molecular weight liquid crystalline material, wherein the polymerized material a) forms a permanently oriented network in the low-molecular weight liquid crystalline material b), characterized in that the low-molecular weight liquid crystalline material b) comprises at least one chiral mesogenic terpenoid derivative.

The invention further relates to a display cell comprising two opposite plates which are transparent to light as the substrate, which plates are provided with an electrode of a material which is transparent to light on the sides facing each other, said electrode carrying an orientation layer and a sealing material being provided between the ends of the plates, a liquid-crystalline material being introduced in the space-between the plates and the sealing material which is in the form of, for example, a ring.

BACKGROUND OF THE INVENTION

In the European Patent Application EP 451 905 a liquid crystalline material in the form of an anisotropic gel comprising a polymerized liquid crystalline material and a low-molecular weight nematic liquid crystalline material is disclosed.

The U.S. Pat. No. 5,210,630 discloses a liquid-crystal display with a layer of an optically anisotropic material comprising a polymer network having a helicoidal order which is manufactured from a curable liquid-crystalline composition including optically active dopant with a chiral alkyl group.

The terpenoid derivatives are known for example from M.F. Bone et al., Mol. Crystl. Liq. Cryst. Letters, 1986, vol. 3 (6), pp. 189–195 and WO 86/04328 which disclose such compounds as components of ferroelectric liquid crystals. It is well known that materials with weak HTP (helical twisting power) values are required for ferroelectric liquid crystals (e.g., S.T. Lagerwall, I. Dahl. Mol. Cryst. Liq. Cryst., 1984, vol. 114, pp. 151–187).

No one skilled in the art, therefore, could recognize that the compounds. of the invention, having strong HTP values would be suitable as additives for thermochromic cholesteric phases and have extraordinarily high stability against light, especially UV.

Thermochromic phases containing similar compounds are described in the U.S. Pat. No. 5,188,815 which discloses bis-menthyl terephthaloate and bis-menthyl biphenylcarboxylate.

G.S. Chilanja et al. (Mol. Cryst. Liq. Cryst. Letter Vol. 3(3–4), 1986, pp. 97–102) describe that menthyl 4-nitrobenzoate shows colored cholesteric phases when mixed with a nematic mixture.

A great disadvantage for many applications of these materials is that they possess relatively high HTP values and have to be used in large amounts to induce a helical twist suitable for thermochromic applications. Another adverse property of phases based on these compounds is that the clearing point of the doped nematic host mixtures is depressed to very low temperatures.

Japanese Patent JP 86 1015 discloses the use of certain menthol esters as components for thermochromic compositions. There is no hint that these compositions are suitable for the preparation of anisotropic gels.

The meaning of the expression "mesogenic group", which denotes a so-called "rod-like", group, is well-known to the skilled worker and defines a group consisting of ring groups, bridging groups and a terminal group (see, e.g., J. Kelker, H. Hatz, Handbook of Liquid Crystals).

SUMMARY OF THE INVENTION

In accordance with the invention, a liquid crystalline material as described in the opening paragraph is obtained, wherein polymerized material a) forms a permanently oriented network in the low-molecular weight liquid crystalline material b), characterized in. that the low-molecular weight liquid crystalline material exhibits a cholesteric phase and comprises at least one chiral mesogenic terpenoid derivative. Preferably, said material b) forms a continuous phase around the network of material a). Further, low molecular weight liquid crystalline material, b), is preferably a non-polymerizable liquid crystal compound preferably of a molecular weight not more than 1500.

Upon further study of the specification and appended claims, further objects and advantages of this invention will become apparent to those skilled in the art.

Preferred embodiments of the invention are:

a). A liquid crystalline material wherein material b) comprises at least one terpenoid derivative of formula I

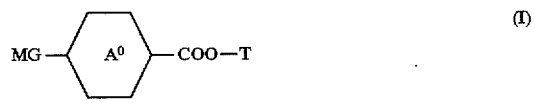

(I)

wherein

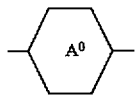

is 1,4-phenylene optionally substitutedby 1 to 4 flourine atoms or is 1,4-cyclohexylene, T is a terpenoid radical, and MG is a mesogenic group, or forms a mesogenic group with

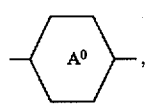

preferably MG is a group of formula II

(II)

wherein $R^1$ is hydrogen or a straight-chained or branched alkyl or alkenyl with 1 to 16 C atoms, wherein one or two non-adjacent $CH_2$ groups are optionally replaced by —O—, —S—, —CO—O— and/or —O—CO—, $A^1$ and $A^2$ each independently denote:
  (a) 1,4-phenylene optionally substituted by 1 to 4 fluorine atoms, in which one or two CH groups may be replaced by N,
  (b) 1,4-cyclohexylene optionally substituted by —CN or —$CH_3$, in which one or two $CH_2$ groups may be replaced by O, (c) naphthalene-2,6-diyl, piperidin-1,4-diyl, $Z^1$ and $Z^2$ are each independently —CO—O—, —O—CO—, —CH$_2$O—, —OCH$_2$—, —N=CH—, —CH=N—, —CH$_2$CH$_2$—, —C≡C— or a single bond and m is 0, 1 or 2.

b) A liquid crystalline material wherein the polymerized material a) is selected from polymers of (meth-) acrylates, epoxy compounds, vinyl ether compounds and thiolene compounds.

c) A liquid crystalline material wherein material b) is a liquid crystalline medium comprising at least two components wherein at least one component is a chiral mesogenic compound comprising a radical selected from menthyl, neomenthyl, isolongifolyl, fenchyl, carreyl, myrthenyl, nopyl citronelly and dihydrocitronelly.

d) A liquid crystalline material wherein the material b) contains at least one achiral compound of formula III

$$R^1—(A^1—Z^1)_o—A^2—R^2 \quad (III)$$

wherein $R^1$ and $R^2$ are each independently a straight-chained or branched alkyl or alkenyl with 1 to 16 C atoms, in which one or two non-adjacent CH$_2$ groups may be replaced by —O—, —CO—O—, —O—CO— or —O—CO—O—, one of $R^1$ and $R^2$ may also be H, F, Cl, CF$_3$, OCF$_3$, OCF$_2$H or CN, $R^1$ is preferably alkyl or alkoxy with 1 to 7 C atoms, and $R^2$ is preferably CN, Cl or F, $A^1$ and $A^2$ are each independently optionally fluorinated 1,4-phenylene in which one or two CH groups may be replaced by N or 1,4-cyclohexylene in which one or two non-adjacent CH$_2$ groups may be replaced by O, preferably 1,4-phenylene optionally substituted by 1–2 F atoms or 1,4-cyclohexylene, $Z^1$ and $Z^2$ are each independently —CO—O—, —O—CO—, —OCH$_2$—, —CH$_{2l\ o-}$, —$_{CH2}$CH$_2$—, —C≡C—, —C≡C—C—C— or a single bond, preferably —CO—O— or a single bond, is 1, 2 or 3.

e) A liquid crystalline material wherein the polymerized material a) is a polymer of polymerizable rod-like compound of the formula IV $$R^4—p—X—A^3—Z—A^4—R^5 \quad (IV)$$

wherein $R^4$ is CH$_2$=CW—COO—,

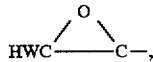

HWN—, CH$_2$=CH— or HS—CH$_2$—(CH$_2$)$_m$—COO— with W being H, Cl or alkyl with 1–5 C atoms and m being 1–7, P is alkylene of 1–24, preferably 1 to 12, C atoms, it being also possible for one or more non-adjacent CH$_2$ groups to be replaced by —O—, X is —O—, —S—, —COO—, —OCO— or a single bond, $R^5$ is an alkyl radical with 1 to 15 C atoms which is unsubstituted, mono- or polysubstituted by halogen, it being also possible for one or more CH$_2$ groups in these radicals to be replaced, in each case independently of one another, by —O—, —S—, —CO—, —OCO—, —CO—O— or —O—CO—O— in such a manner that oxygen atoms are not linked directly to one another, or alternatively $R^5$ has one of the meanings given for $R^4$—P—X—, $A^3$ is a 1,4-phenylene or a naphthalene-2,6-diyl radical which is unsubstituted or substituted with 1 to 4 halogen atoms, $A^4$ is

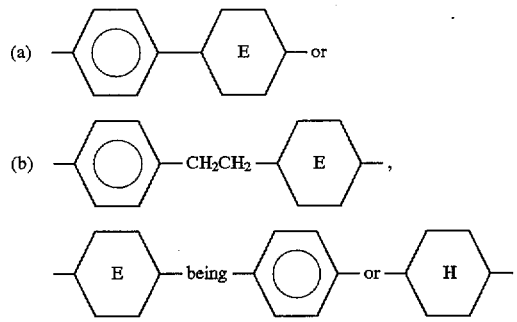

it being possible for radicals. (a) and (b) to be substituted by CN or halogen and one of the 1,4-phenylene groups in (a) and (b) can also be replaced by a 1,4-phenylene radical in which one or two CH groups are replaced by N, and Z is —CO—O—, —O—CO—, —CH$_2$CH$_2$— or a single bond.

f) A liquid crystalline material wherein the polymerized material a) is a polymer of a bis-(meth)acrylate or a bisvinylether of formula IVA

$$CH_2=C+C)_a O[(CH_2)_m A]_n—B—[A—(CH_2)_m]_n—O+C)_a C=CH_2 \quad (IVA)$$
$$\quad |\ ||\ \quad\quad\quad\quad\quad\quad\quad\quad\quad\quad\quad\quad\quad\quad ||\ |$$
$$\quad R\ O\ \quad\quad\quad\quad\quad\quad\quad\quad\quad\quad\quad\quad\quad\quad\quad\quad O\ R$$

wherein A is —O—, —CO—O—, —O—CO— or a single bond,

B is selected from —(CH$_2$)$_s$—

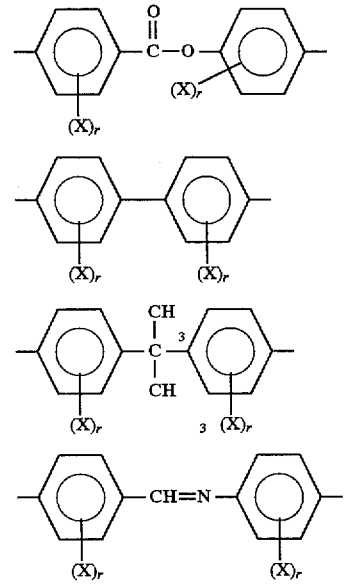

-continued

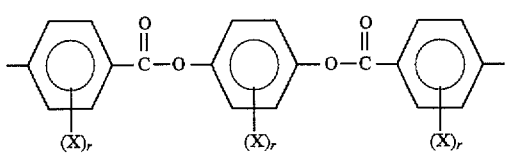

with X being $CH_3$ or F, r being 0, 1 or 2, and s an integer from 1 to 6, a is 0 or 1, and each n and m are independently integers from 0 to 20.

g) A liquid crystalline material wherein polymerized material a) is present in the gel in a quantity of 1–50% by weight, in particular.

h) A liquid crystalline material wherein material b) contains at least one achiral compound selected from the formulae IIIa to IIIc

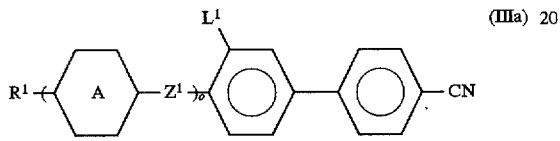 (IIIa)

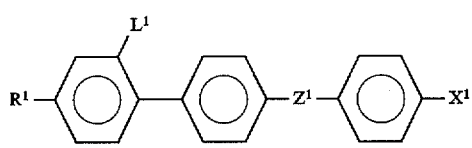 (IIIb)

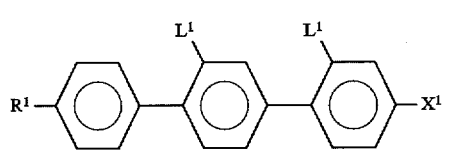 (IIIc)

wherein $R^1$ has the meaning given above, and each $L^1$ is independently H or F, $X^1$ is F or Cl, $Z^1$ is COO, —$CH_2CH_2$— or a single bond,

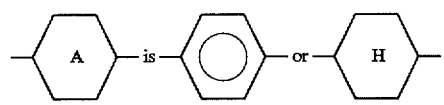

and o is 0, 1 or 2.

In particular, material b) preferably contains a compound selected from the formulae IIIa1 to IIIa4, IIIb1, IIIc1 and IIIc2:

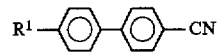 (IIIa1)

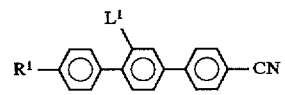 (IIIa2)

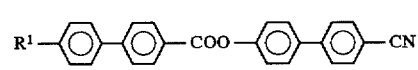 (IIIa3)

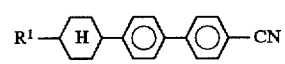 (IIIa4)

-continued

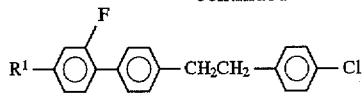 (IIIb1)

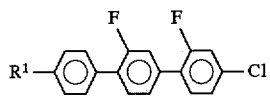 (IIIc1)

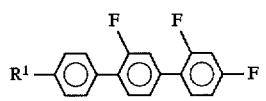 (IIIc2)

wherein $R^1$ and $L^1$ have the meaning given.

i) A material obtainable by admixing a) a polymerizable material of formula IV or IVA above, b) at least one terpenoid of formula I or other chiral nematic low-molecular weight material comprising at least one chiral mesogenic terpenoid derivative, and c) a photoinitiator, and irradiating the mixture with UV light.

j) Another embodiment of the invention is a chiral composition for the preparation of a liquid crystalline material comprising a) a polymerizable material of formula IV or IVA above, b) at least one terpenoid of formula I or other chiral nematic low-molecular weight material comprising at least one terpenoid derivative, and c) a photoinitiator.

The invention relates furthermore to a display cell comprising two opposing plates which are transparent to light as the substrate, which plates are provided with an electrode of a material which is transparent to light on the sides facing each other, said electrode carrying an orientation layer, and a sealing material being provided between the ends of the plates, a liquid crystalline material being introduced in the space between the plates and the sealing material, wherein the liquid crystalline material is composed of at least two different liquid crystalline materials, at least one of which is a material as described above.

The chiral nematic low-molecular weight material comprises preferably,

50–88% of at least one, preferably 2 to 15, compounds of formula III, and 12–50% of at least one, preferably 1, 2 or 3, compounds of formula I.

The cholesteric liquid crystalline media according to the present invention preferably are obtained by admixing a nematic base mixture consisting of at least one, preferably 2–15, compounds of formula III with a chiral terpenoid of formula I.

In a preferred embodiment said cholesteric mixture essentially consists of 50 to 90% of at least one compound of formula III, and 10 to 50% of at least one compound of formula I.

The acrylates of formula IVA1

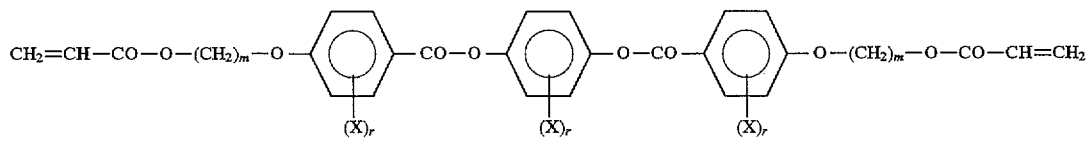

(IVA1)

are preferred as polymerizable material for polymerized material a), in particular wherein r is 0 and m is 6 in formula IVA1.

Formula IV includes reactive liquid crystalline compounds with 3 rings of formulae IV1–IV20

| | |
|---|---|
| $R^4$—P—X—Phe'—Z—Phe"—Phe"—$R^5$ | IV1 |
| $R^4$—P—X—Phe'—Z—Pyd—Phe"—$R^5$ | IV2 |
| $R^4$—P—X—Phe'—Z—Pyr—Phe"—$R^5$ | IV3 |
| $R^4$—P—X—Phe'—Z—Phe"—Pyd—$R^5$ | IV4 |
| $R^4$—P—X—Phe'—Z—Phe"—Pyr—$R^5$ | IV5 |
| $R^4$—P—X—Phe'—Z—Phe"—$CH_2CH_2$—Phe"—$R^5$ | IV6 |
| $R^4$—P—X—Phe'—Z—Pyd—$CH_2CH_2$—Phe"—$R^6$ | IV7 |
| $R^4$—P—X—Phe'—Z—Pyr—$CH_2CH_2$—Phe"—$R^5$ | IV8 |
| $R^4$—P—X—Phe'—Z—Phe"—$CH_2CH_2$—Pyd—$R^5$ | IV9 |
| $R^4$—P—X—Phe'—Z—Phe"—$CH_2CH_2$—Pyr—$R^5$ | IV10 |
| $R^4$—P—X—Nap'—Z—Phe"—Phe"—$R^5$ | IV11 |
| $R^4$—P—X—Nap'—Z—Pyd—Phe"—R | IV12 |
| $R^4$—P—X—Nap'—Z—Pyr—Phe"—$R^5$ | IV13 |
| $R^4$—P—X—Nap'—Z—Phe"—Pyd—$R^5$ | IV14 |
| $R^4$'P—X—Nap'—Z—Phe"—Pyr—$R^5$ | IV15 |
| $R^4$—P—X—Nap'—Z—Phe"—$CH_2CH_2$—Phe'—$R^5$ | IV16 |
| $R^4$—P—X—Nap'—Z—Pyd—$CH_2CH_2$—Phe"—$R^5$ | IV17 |
| $R^4$—P—X—Nap'—Z—Pyr—$CH_2CH_2$—Phe"—$R^5$ | IV18 |
| $R^4$—P—X—Nap'—Z—Phe"—$CH_2CH_2$—Pyd—$R^5$ | IV19 |
| $R^4$—P—X—Nap'—Z—Phe"—$CH_2CH_2$—Pyr—$R^5$ | IV20 | wherein $R^4$, $R^5$, P, X and Z have the meanings given above, Pyd denotes pyrimidine-2,5-diyl, and Pyr denotes pyridine-2,5-diyl.

In the compounds of formulae IV1–IV10, Phe' denotes a 1,4-phenylene group

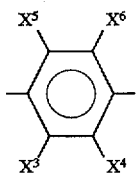

wherein $X^3$–$X^6$ denote independently from each other H or halogen.

In the compounds of formulae IV1–IV20, Phe" is a 1,4-phenylene group, which is unsubstituted or mono- or polysubstituted by CN or halogen, and in formulae IV15–IV20, Nap' is a naphthalene-2,6-diyl group

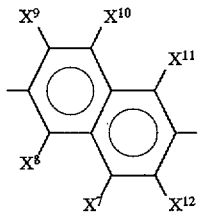

which is unsubstituted or wherein up to 4 of $X^7$–$X^{12}$ are independently from each other halogen while the others denote H.

The compounds of formulae IV1–IV20 are preferred. Especially preferred are the compounds of formulae IV1–IV3, IV6–IV10, IV13–IV15, IV18–IV20, and, in particular the compounds of formulae IV1, IV8, IV15 and IV20.

In the compounds of formulae IV1–IV20, $R^4$ is $CH_2=CW$—COO—, $CH_2=CH$—,

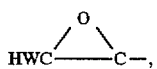

HWN—, HS—$CH_2$—$(CH_2)_m$—COO— with W being H, Cl or alkyl with 1–5 C atoms and m being 1–7.

Preferably, $R^4$ is a vinyl group, an acrylate group, an amino group or a mercapto group, and especially preferred are the following meanings of $R^4$:

| | |
|---|---|
| $CH_2=CH$—COO— | $R^4$-1 |
| $CH_2=C$—COO—<br>$\|$<br>$CH_3$ | $R^4$-2 |
| $CH_2=C$—COO—<br>$\|$<br>Cl | $R^4$-3 |
| $CH_2=CH$— | $R^4$-4 |
| $H_2N$— | $R^4$-5 |
| H(alkyl)N— | $R^4$-6 |
| HS—$CH_2$—$(CH_2)_m$—COO— | $R^4$-7 |
| 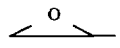 | $R^4$-8 | with alkyl denoting $C_1$–$C_3$-alkyl and m being 1–5.

In the compounds of formulae IV1-IV20 or IV, the spacer-type group P is alkylene with up to 24 C atoms, it is also being possible for one or more non-adjacent $CH_2$ groups to be replaced by O.

When P is alkylene, P may be straight-chain or branched. Especially preferred as P is ethylene, propylene, butylene, 1-methyl-propylene, 2-methyl-propylene, pentylene, 1-methyl-butylene, 2-methyl-butylene, hexylene, 2-ethyl-butylene, 1,3-dimethyl-butylene, heptylene, 1-methylhexylene, 2-methylhexylene, 3-methylhexylene, 4-methylhexylene, 5-methylhexylene, 6-methylhexylene, octylene, 3-ethyl-hexylene, nonylene, 1-methyloctylene, 2-methyloctylene, 7-methyloctylene, decylene, undecylene, dodecylene, 2-methylundecylene, 2,7,5-trimethyl-nonylene or 3-propylnonylene.

When P is mono- or polyoxaalkylene, P may be straight-chain or branched. In particular, P is 1-oxa-ethylene, 1-oxapropylene, 2-oxapropylene, 1-oxa-butylene, 2-oxabutylene, 1,3-dioxabutylene, 1-oxa-pentylene, 2-oxa-pentylene, 3-oxa-pentylene, 2-oxa-3-methyl-butylene, 1-oxahexylene, 2-oxa-hexylene, 3-oxa-hexylene, 1,3-dioxa-hexylene, 1,4-dioxa-hexylene, 1,5-dioxa-hexylene, 1-oxa-heptylene, 2-oxa-heptylene, 1,3-dioxaheptylene, 1,4-dioxa-heptylene, 1,5-dioxa-heptylene, 1,6-dioxa-heptylene, 1,3,5-trioxaheptylene, 1-oxa-octylene, 2-oxa-octylene, .3-oxa-octylene, 4-oxa-octylene, 1,3-dioxa-octylene, 1,4-dioxa-nonylene, 1,4-dioxa-decylene, 1,4-dioxa-undecylene and 1,3,5-trioxadodecylene.

X is —O—, —S—, —COO—, —OCO— or a single bond and in particular —O—, —COO—, —OCO— or a single bond. In case X is —O—, —S— or —OCO—, the adjacent CH$_2$— group of P is not replaced by —O—.

Z is —COO—, —OCO—, —CH$_2$CH$_2$— or a single bond. In the compounds of formulae IV1–IV7 and IV15–IV19, Z preferably is —COO—, —OCO— or a single bond. In the compounds of formulae IV8–IV14 and IV20, Z preferably is —CH$_2$CH$_2$— or a single bond.

R$^5$ can be an alkyl radical with up to 15 C atoms which is unsubstituted, mono- or polysubstituted by halogen, it also being possible for one or more CH$_2$ groups in these radicals to be replaced, in each case independently from one another, by —O—, —S—, —CO—, —OCO—, —COO— or—O—COO— in such a manner that oxygen atoms are not linked directly to one another.

When R$^1$, R$^2$ and/or R$^5$ are each independently an alkyl radical or alkoxy radical, it may be straight-chain or branched. Preferably, it is straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy or octoxy, and furthermore methyl, nonyl, decyl, undecyl, tridecyl, tetradecyl, pentadecyl, methoxy, nonoxy, decoxy, undecoxy, dodecoxy, tridecoxy or tetradecoxy.

When R$^1$, R$^2$ and/or R$^5$ are each independently oxaalkyl, it is preferably straight-chain 2-oxapropyl (=methoxymethyl), 2-oxabutyl (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

Preferred branched radicals R$^1$, R$^2$ and/or R$^5$ are each independently isopropyl,. 2-butyl (=. 1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methyloctoxy, 6-methyloctanyloxy, 5-methylheptyloxycarbonyl, 2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxy-pentyl, 2-methyl-3-oxahexyl.

R$^5$ can also have one of the meanings given for R$^4$—P—X— above. In case R$^5$ is an— optionally substituted - alkyl radical, R$^4$ preferably is a vinyl or acrylate group, while when R$^5$ is R$^4$—P—X, all meanings given above for R$^4$ are preferred.

The inventive display exhibits two opposing plates which are transparent to light and which will hereinafter be termed substrates and which comprise electrodes on the opposing sides, said electrodes being manufactured from, for example, In$_2$O$_3$·SnO$_2$. On the electrode there is provided an orientation layer of, for example, rubbed polyimide or polyamide by means of which the liquid crystalline material according to the invention can be homogeneously aligned between the electrodes. The cell is manufactured by arranging the substrates thus formed and provided with electrodes closing the apertures by, for example, a ring-shaped member and filling the space between the substrates and the ring with the liquid crystalline material according to the invention. In practice, a bonding layer of an epoxy compound can be used instead of the ring.

The liquid crystalline material can be capillary filled between two substrates which are provided with electrode layers, and is then subsequently cured, for example, by irradiation with UV light, preferably in the presence of a photoinitiator, for example, Irgacure® or Darcure®. Another possible but less attractive technique comprises coating of the LC material on a substrate with subsequent curing. The film may be peeled off and arranged, between 2 substrates provided with electrode layers. It is also possible that the substrate onto which the LC material is applied exhibits an electrode layer so that the electrooptical. system can be obtained by applying a second electrode layer and, optionally, a second substrate onto the coated and cured film.

The electrooptical system according to the invention can be operated reflectively or transmissively so that at least one electrode and, if present, the associated substrate are transparent. Both systems customarily contain no polarizers, as a result of which a. distinctly higher light transmission results and is a considerable technological simplification in the production of these systems compared with conventional liquid crystal systems such as, for example, TN or STN cells.

In general a nematic liquid crystal of positive dielectric anisotropy is desirable because these mixtures would be used in devices in which it is essential to electrically switch a thin film of such a mixture into a homeotropic alignment (field on state) and therefore appear clear to transparent, while the off state would usually be determined by the alignment within the cell, which is usually homogenous and this would give either the focal conic (slightly scattering) or grandjean (colored) state. It is possible that depending on how the voltage is applied or removed one can flip into either the colored grandjean or the slightly scattering focal conic state in the field off state. Moreover, by adding a small amount of a reactive liquid,crystal each state can be stabilized to give a bistable device with one stage being colored (grandjean texture) or essentially clear or slightly light scattering (focal conic). When placed against a blank background, a contrast between colored and black is clearly seen. The color being dependent on the pitch length of the cholesteric helix according to the equation $\lambda_{max}$=ñ P sin Θ

ñ=mean refracture index of the LC,

P=pitch length

Θ=viewing angle.

The pitch length obtained when adding a chiral dopant to a nematic host depends on the polarizing ability of the LC molecules— the more polarizable they are the tighter the pitch length obtained (higher twisting power), so using a non-polar host may significantly alter how much chiral dopant would be needed to produce a given color.

Another application for chiral components of formula I is to mix them with reactive liquid crystals (for example of formula IV or IVA) and produce a chiral colored reactive LC mixture which can be coated into a thin film and polymerized by UV light to give a thin polymer film which is colored. It would contain 10–30%w non-reactive chiral LC as above, therefore, the polymer content is 70–90%.

Generally, such a chiral colored reactive LC mixture comprises 75–80% of one, two or more compounds of formula IVA and 10 to 25% of one terpenoid of formula I and 0.2 to 1.0w of a photoinitiator. Such cholesteric reactive compositions are suitable for the preparation of polarizing beam splitters and reflective polarizers.

The rise time increases accordingly as the cell thickness increases, but the decay time remains constant. The decay time decreases rapidly accordingly as the content of network molecules increases. Consequently, it is not the thickness of the cell that counts but the average distance between the network molecules. This explains the short decay times in comparison with the decay times (a few hundred milliseconds) in normal nematic cells. More particularly, decay times of a few milliseconds can be obtained.

The liquid crystalline materials according to the invention are in particular suitable for liquid crystal devices for show windows which have a dimmer layer made of a transparent solid material and said liquid crystalline material between a pair of substrates with electrode layers. These devices operate in reverse mode and lower potential and show lower hysteresis and improved electrooptical characteristics. The substrate has an orientation film on it. The liquid crystalline material exhibits preferably a helical pitch of 0.5 to 5 µm, and the thickness of the dimmer layer is 2 to 40 µm.

Another preferred embodiment of the invention is a liquid-crystal display device in which the inventive liquid crystalline material forms a layer between one of the polarizers and the cell as disclosed in U.S. Pat. No. 5,210,630. The inventive materials are highly suitable to compensate the temperature dependence of dAn of the low molecular-weight liquid crystal of said liquid-crystal display.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages. are by weight.

The entire disclosure of all applications, patents and publications, cited above and below, and of corresponding British application 9501853.7, filed Jan. 31, 1995, are hereby incorporated by reference.

The invention will be explained in more detail by means of the following examples of the preparation of a liquid crystalline material according to the invention.

EXAMPLES

EXAMPLE 1

A mixture is formulated comprising:

$$CH_2=C(CH_3)-COO(CH_2)_6-O-\langle\bigcirc\rangle-COO-\langle\bigcirc\rangle(CH_3)-OCO-\langle\bigcirc\rangle-O(CH_2)_6-OCO-C(CH_3)=CH_2 \quad 51.68\%$$

$$CH_2=CH-COO(CH_2)_6-O-\langle\bigcirc\rangle-COO-\langle\bigcirc\rangle(CH_3)-OCO-\langle\bigcirc\rangle-O(CH_2)_6-OCOCH=CH_2 \quad 34.80\%$$

$$C_6H_{13}O-\langle\bigcirc\rangle-\langle\bigcirc\rangle-COO-\langle\text{cyclohexyl-}iPr\rangle \quad 12.96\%$$

Irgacure ® 651    0.56% and shows: K 56 N* 80 I $\lambda_{max}$ at 20° C.: 509 nm

The composition is cured at 10° C using UV-light of 20 mWcm$^{-2}$.

$\lambda_{max}$ at 20° C. after curing: 592 nm

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A liquid crystalline material in the form of an anisotropic gel comprising a polymerized monotropic or enantiotropic liquid crystalline material and a chiral nematic low-molecular weight liquid crystalline material, wherein the polymerized material a) forms a permanently oriented network in the low-molecular weight liquid crystalline material b), and wherein the low-molecular weight liquid crystalline material b) comprises at least one terpenoid compound of formula I

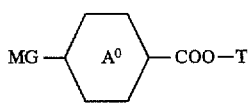 (I)

wherein

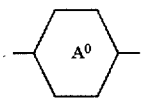

is 1,4-phenviene optionally substituted by 1 to 4 fluorine atoms or is
1,4-cyclohexylene, T is a terpenoid radical,
and MG is a mesogenic group, or forms a mesogenic group with

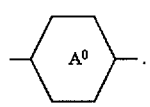

2. A material as claimed in claim 1, wherein MG is a group of formula II $$R^{1\prime}(A^1-Z^1)_m-A^2-Z^2-$$ (II)

wherein
$R^1$ is hydrogen or a straight-chained or branched alkyl or alkenyl with 1 to 16 C atoms, wherein one or two non-adjacent $CH_2$ groups may independently be replaced by —O—, —S—, —CO—O— or —O—CO—, $A^1$ and $A^2$ each independently denote:
(a) 1,4-phenylene optionally substituted by 1 to 4 fluorine atoms, in which one or two CH groups may be replaced by N,
(b) 1,4-cyclohexylene optionally substituted by —CN or —$CH_3$, in which one or two $CH_2$ groups may be replaced by O, or
(c) naphthalene-2,6-diyl or piperidin-1,4-diyl, $Z^1$ and $Z^2$ are each independently —CO—O—, —O—CO—, —$CH_2$O—, —O$CH_2$—, —N=CH—, —CH=N—, —$CH_2CH_2$—, —C≡C— or a single bond
and
m is 0, 1 or 2.

3. A liquid crystalline material as claimed in claim 1, wherein material a) is a polymer of an acrylate compound, epoxy compound, vinyl ether compound or thiolene compound.

4. A liquid crystalline material according to claim 1, wherein material b) is a liquid crystalline medium comprising at least two components wherein at least one component is a chiral mesogenic compound having a menthyl, neomenthyl, isolongifolyl, fenchyl, carreyl, myrthenyl, nopyl citronelly or dihydrocitronelly radical.

5. A liquid crystalline material according to claim 1, wherein material b) contains at least one achiral compound of formula III

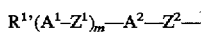

$$R^1-(A^1-Z^1)_o-A^2-R^2$$ (III)

wherein
$R^1$ and $R^2$ are each independently a straight-chained or branched alkyl or alkenyl with 1 to 16 C atoms, in which one or two non-adjacent $CH_2$ groups may independently be replaced by —O—, —CO—O—, —O—CO— or —O—CO—O—, one of $R^1$ and $R^2$ may also be H, F, Cl, $CF_3'OCF_3'OCF_2H$ or CN, $A^1$ and $A^2$ are each independently optionally fluorinated 1,4-phenylene in which one or two CH groups may be replaced by N or 1,4-cyclohexylene in which one or two non-adjacent $CH_2$ groups may independently be replaced by O, $Z^1$ and $Z^2$ are each independently —CO—O—, —O—CO—, —$OCH_2$—, —$CH_2$O—, —$CH_2CH_2$—, —C≡C—, —C≡C—C≡C— or a single bond, o is 1, 2 or 3.

6. A liquid crystalline material as claimed in claim 5, wherein $R^1$ is alkyl or alkoxy with 1 to 7 C atoms, and $R^2$ is CN, Cl or F.

7. A liquid crystalline material as claimed in claim 5, wherein $A^1$ and $A^2$ are each independently 1,4-phenylene optionally substituted by 1-2 F atoms or 1,4-cyclohexylene.

8. A liquid crystalline material as claimed in claim 5, wherein $Z^1$ and $Z^2$ are each independently —CO—O— or a single bond.

9. A liquid crystalline material as claimed in claim 1, wherein material a) is a polymer of a polymerizable rod-like compound of the formula IV $$R^4-P-X-A^3-Z-A^4-R^5$$ (IV)

wherein
$R^4$ is $CH_2$=CW—COO—,

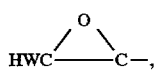

HWN—, $CH_2$=CH— or HS—$CH_2$—$(CH_2)_m$—COO— with W·being H, Cl or alkyl with 1–5 C atoms and m being 1–7, P is alkylene of 1 to 24 C atoms, optionally with one or more non-adjacent $CH_2$ groups replaced by —O—, X is —O—, —S—, —COO—, —OCO—0 or a single bond, $R^5$ is an alkyl radical with 1 to 15 C atoms which is unsubstituted, mono- or polysubstituted by halogen, optionally with one or more $CH_2$ groups in these radicals replaced, in each case independently of one another, by —O—, —S—, —CO—, —OCO—, —CO—O— or —O—CO—O— in such a manner that oxygen atoms are not linked directly to one another, or alternatively $R^5$ has one of the meanings given for $R^4$—P—X—, $A^3$ is a 1,4-phenylene or a naphthalene-2,6-diyl radical which is unsubstituted or substituted with 1 to 4 halogen atoms, $A^4$ is

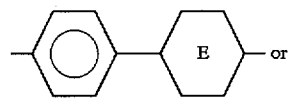 (a)

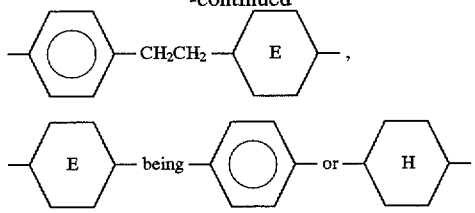

radicals (a) and (b) optionally being substituted by CN or halogen and one of the 1,4-phenylene groups in (a) and (b) is optionally replaced by a 1,4-phenylene radical in which one or two CH groups are replaced by N, and z is —CO—O—, —O—CO—, —CH$_2$CH$_2$— or a single bond.

10. liquid crystalline material as claimed in claim 1, wherein material a) is present in the gel in a quantity of 1–50% by weight.

11. A liquid crystalline material as claimed in claim 10, wherein material a) is present in the gel in a quantity of 2–20w by weight.

12. A display cell comprising two opposing plates, which are transparent to light, as the substrate, which plates are provided with an electrode of a material which is transparent to light on the sides facing each other, said electrode carrying an orientation layer, and a sealing material being provided between the ends of the plates, a liquid crystalline material being provided in the space between the plates and the sealing material, wherein the liquid crystalline material is composed of at least two different liquid crystalline materials, at least one of which is a material. according to claim 1.

13. A liquid crystalline material as claimed in claim 1, wherein material b) contains at least one achiral compound of one of formulae IIIa to IIIc

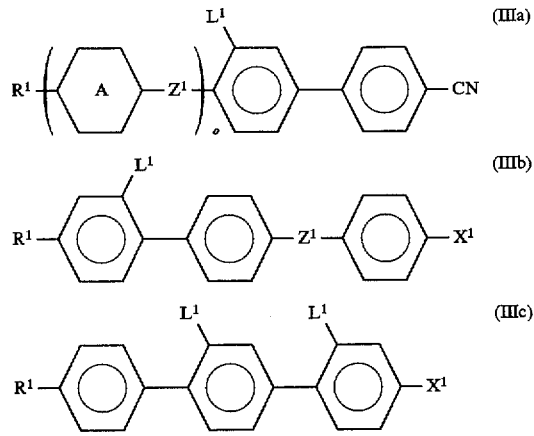

wherein

R$^1$ is hydrogen or a straight-chained or branched alkyl or alkenyl with 1 to 16 C atoms, wherein one or two non-adjacent CH$_2$ groups may independently be replaced by —O—, —S—, —CO—O— or —O—CO—, L$^1$ is H or F, X$^1$ is F or Cl, Z$^1$ is COO, —CH$_2$CH$_2$— or a single bond,

and o is 0, 1 or 2.

14. A material as claimed in claim 13, which contains at least one achiral compound selected from those of the formulae IIIa1 to IIIa4, IIIb1, IIIc1 and IIIc2:

 (IIIa1)

 (IIIa2)

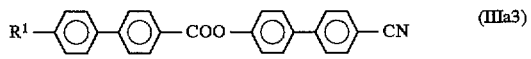 (IIIa3)

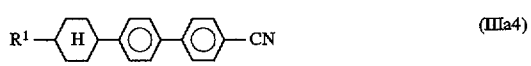 (IIIa4)

 (IIIb1)

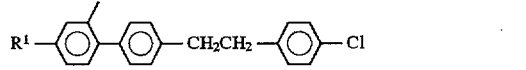 (IIIc1)

 (IIIc2)

wherein R$^1$ ands L$^1$ have the meaning given.

15. A material as claimed in claim 1, obtained by admixing a) a polymerizable material of formula IV or IVA

R$^4$—P—X—A$^3$—Z—A$^4$—R$^5$     (IV)

wherein

R$^4$ is CH$_2$=CW—COO—,

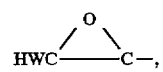

HWN—, CH$_2$=CH— or HS—CH$_2$—(CH$_2$)$_m$—COO— with W being H, Cl or alkyl with 1–5 C atoms and m being 1–7, P is alkylene of 1 to 24 C atoms, optionally with one or more non-adjacent CH$_2$ groups replaced by —O—, X is —O—, —S—, —COO—, —OCO— or a single bond, R$^5$ is an alkyl radical with 1 to 15 C atoms which is unsubstituted, mono- or polysubstituted by halogen, optionally with one or more CH$_2$ groups in these radicals replaced, in each case independently of one another, by —O—, —S—, —CO—, —OCO—, —CO—O— or —O—CO—O— in such a manner that oxygen atoms are not linked directly to one another, or alternatively Rs has one of the meanings given for R$^4$—P—X—, A³ is a 1,4-phenylene or a naphthalene-2,6-diyl radical which is unsubstituted or substituted with 1 to 4 halogen atoms, A⁴ is

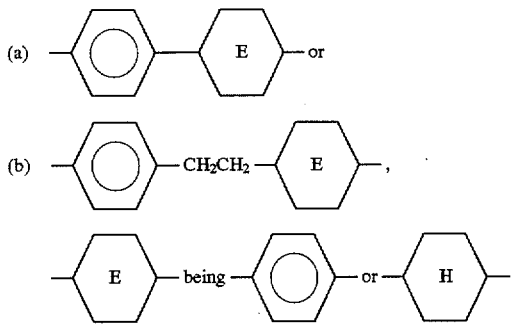

radicals (a) and (b) optionally being substituted by CN or halogen and one of the 1,4-phenylene groups in (a) and (b) is optionally replaced by a 1,4-phenylene radical in which one or two CH groups are replaced by N, and Z is —CO—O—, —O—CO—, —CH₂CH₂— or a single bond,

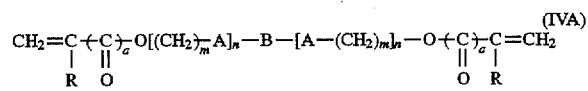

(IVA)

wherein A is —O—, —CO—O—, —O—CO— or a single bond,

B is selected from —(CH₂)ₛ—

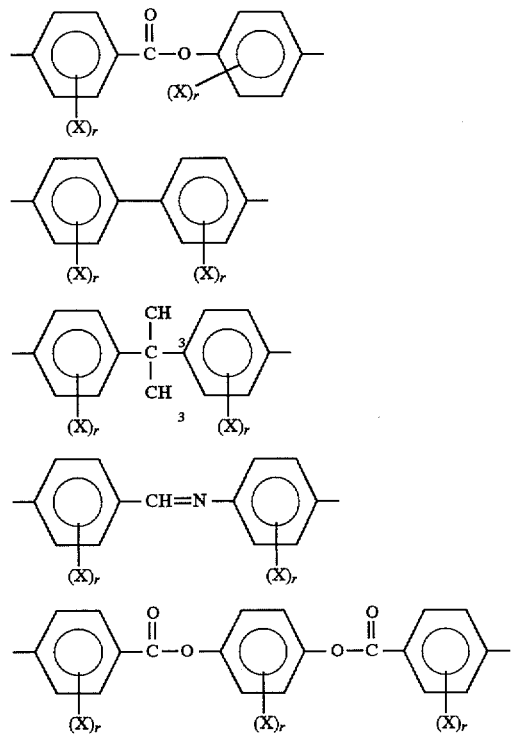

with X being CH₃ or F, r being 0, 1 or 2, and s being an integer from 1 to 6, a is 0 or 1, and n and m are integers from 0 to 20, b) at least one terpenoid of formula I

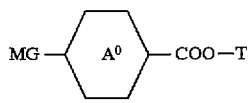

(I)

wherein

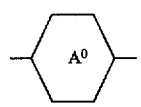

is 1,4-phenylene optionally substituted by 1 to 4 fluorine atoms or is 1,4-cyclohexylene, T is a terpenoid radical, and MG is a mesogenic group, or forms a mesogenic group with

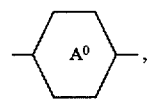

or other chiral nematic low-molecular weight material comprising at least one chiral mesogenic terpenoid derivative, and c) a photoinitiator, and irradiating the resulting[]mixture with UV light.

16. A liquid crystalline material as claimed in claim 1, wherein material a) is a polymer of a bis-(meth)acrylate or a bisvinylether of formula IVA

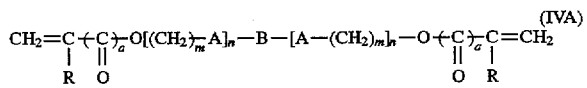

(IVA)

wherein A is —O—, —CO—O—, —O—CO— or a single bond,

B is selected from —(CH₂)ₛ—

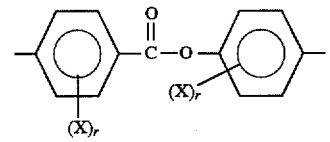

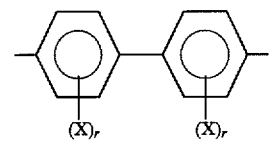

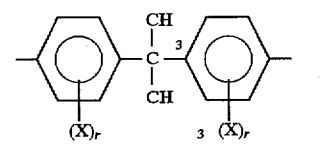

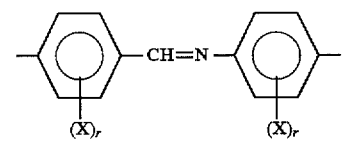

-continued

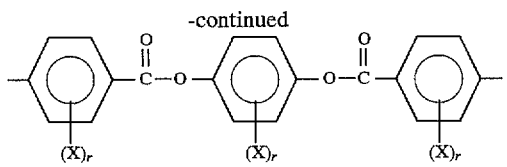

with X being CH₃ or F, r being 0, 1 or 2, and s being an integer from 1 to 6, a is 0 or 1, and n and m are integers frm 0 to 20.

17. The material of claim 1, wherein the liquid crystalline material, b), forms a continuous phase around the permanently oriented network formed from polymerizd material a).

18. The material of claim 1, wherein the liquid crystalline material, b), contains 12–50% of compounds of the formula I.

19. A chiral composition comprising a) a polymerizable material of formula IV or IVA $$R^4-P-X-A^3-Z-A^4-Rs \quad (IV)$$

wherein $R^4$ is $CH_2=CW-COO-$,

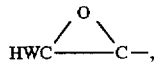

HWN—, $CH_2=CH-$ or $HS-CH_2-(CH_2)_m-COO-$ with W being H, Cl or alkyl with 1–5 C atoms and m being 1–7, P is alkylene of 1 to 24 C atoms, optionally with one or more non-adjacent $CH_2$ groups replaced by —O—, X is —O—, —S—, —COO—, —OCO— or a single bond, $R^5$ is an alkyl radical with 1 to 15 C atoms which is unsubstituted, mono- or polysubstituted by halogen, optionally with one or more CH2 groups in these radicals replaced, in each case independently of one another, by —O—, —S—, —CO—, —OCO—, —CO—O— or —O—CO—O— in such a manner that oxygen atoms are not linked directly to one another, or alternatively $R^5$ has one of the meanings given for $R^4-P-X-$, $A^3$ is a 1,4-phenylene or a naphthalene-2,6-diyl radical which is unsubstituted or substituted with 1 to 4 halogen atoms, $A^4$ is

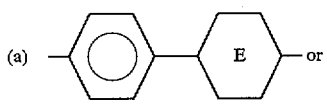

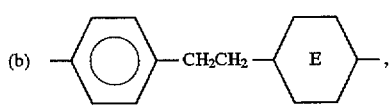

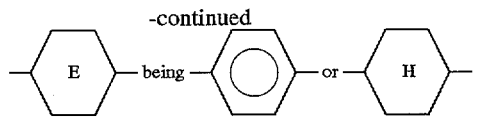

radicals (a) and (b) optionally being substituted by CN or halogen and one of the 1,4-phenylene groups in (a) and (b) is optionally replaced by a 1,4-phenylene radical in which one or two CH groups are replaced by N, and Z is —CO—O—, —O—CO—, —CH₂CH₂— or a single bond,

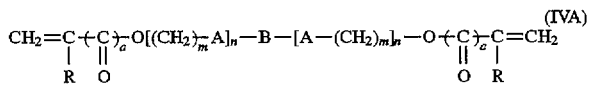

wherein A is —O—, —CO—O—, —O—CO— or a single bond,

B is selected from —(CH₂)ₛ—

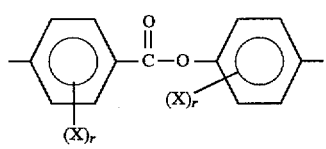

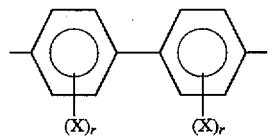

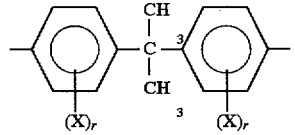

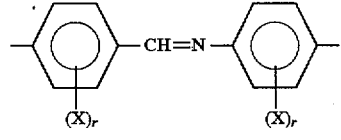

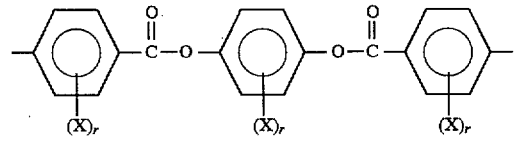

with X being CH₃ or F, r being 0, 1 or 2, and s being an integer from 1 to 6, a is 0 or 1, and n and m are integers from 0 to 20, b) at least one terpenoid of formula I

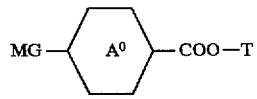

wherein
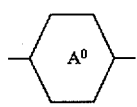
is 1,4-phenylene optionally substituted by 1 to 4 fluorine atoms or is 1,4-cyclohexylene,
T is a terpenoid radical,
and
MG is a mesogenic group, or forms a mesogenic group with
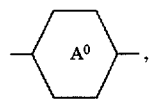
or other chiral nematic low-molecular weight material comprising at least one chiral mesogenic terpenoid derivative, and
c) a photoinitiator.
* * * * *